United States Patent
Dussaume et al.

(10) Patent No.: US 11,962,347 B2
(45) Date of Patent: Apr. 16, 2024

(54) DEVICE AND MECHANISM FOR AUTOMATIC VLC-LAMP SELECTION

(71) Applicant: Orange, Issy-les-Moulineaux (FR)

(72) Inventors: Philippe Dussaume, Chatillon (FR); Micheline Perrufel, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 240 days.

(21) Appl. No.: 17/771,647

(22) PCT Filed: Oct. 8, 2020

(86) PCT No.: PCT/FR2020/051779
§ 371 (c)(1),
(2) Date: Oct. 11, 2022

(87) PCT Pub. No.: WO2021/079040
PCT Pub. Date: Apr. 29, 2021

(65) Prior Publication Data
US 2023/0038941 A1 Feb. 9, 2023

(30) Foreign Application Priority Data
Oct. 25, 2019 (FR) ........................................ 1912013

(51) Int. Cl.
*H04B 10/116* (2013.01)
*H04B 10/114* (2013.01)

(52) U.S. Cl.
CPC ....... *H04B 10/116* (2013.01); *H04B 10/1149* (2013.01)

(58) Field of Classification Search
CPC .................................................... H04B 10/116
See application file for complete search history.

(56) References Cited

U.S. PATENT DOCUMENTS

| 2009/0310971 A1 | 12/2009 | Kim et al. |
| 2011/0069951 A1* | 3/2011 | Son .................... H04B 10/1143 398/17 |

(Continued)

OTHER PUBLICATIONS

English translation of the Written Opinion of the International Searching Authority dated Dec. 14, 2020 for corresponding International Application No. PCT/FR2020/051779, filed Oct. 8, 2020.

(Continued)

*Primary Examiner* — Nathan M Cors
(74) *Attorney, Agent, or Firm* — David D. Brush; Westman, Champlin & Koehler, P.A.

(57) ABSTRACT

The invention relates to a communication device comprising a docking station and a central processing unit.
The docking station comprises a plurality of photoreceptors and a plurality of light sources interjacent with the photoreceptors.
The plurality of photoreceptors and the plurality of light sources are suitable for visible light communication (VLC). The central processing unit is configured for obtaining an initialization signal, selecting a portion of the plurality of light sources of the docking station, ordering an emission of a pairing signal, obtaining a response signal, and ordering a pairing of the terminal with a portion of the plurality of photoreceptors of the docking station and with a portion of the plurality of light sources of the docking station.

12 Claims, 6 Drawing Sheets

(56) References Cited

U.S. PATENT DOCUMENTS

2015/0372754 A1* 12/2015 Choi ...................... H04W 4/70
                                                        398/130
2019/0132055 A1*  5/2019 Deixler ................. H05B 47/19
2019/0215062 A1*  7/2019 Engelen ................ H04W 4/08

OTHER PUBLICATIONS

International Search Report dated Dec. 1, 2020, for corresponding International Application No. PCT/FR2020/051779, filed Oct. 8, 2020.
Written Opinion of the International Searching Authority dated Dec. 1, 2020, for corresponding International Application No. PCT/FR2020/051779, filed Oct. 8, 2020.

* cited by examiner

[Fig. 1]
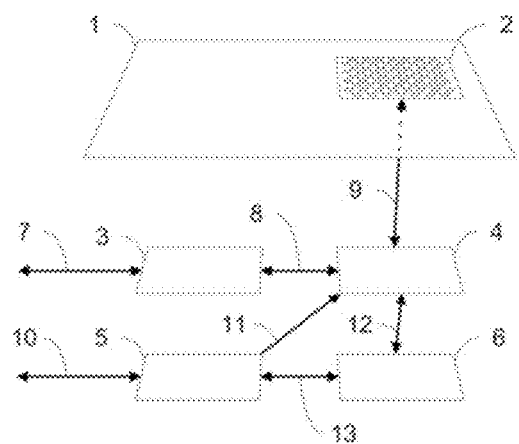
[Fig. 2]
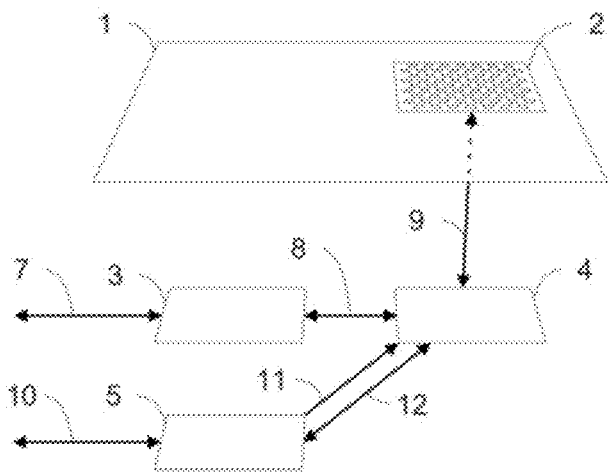

[Fig. 3]
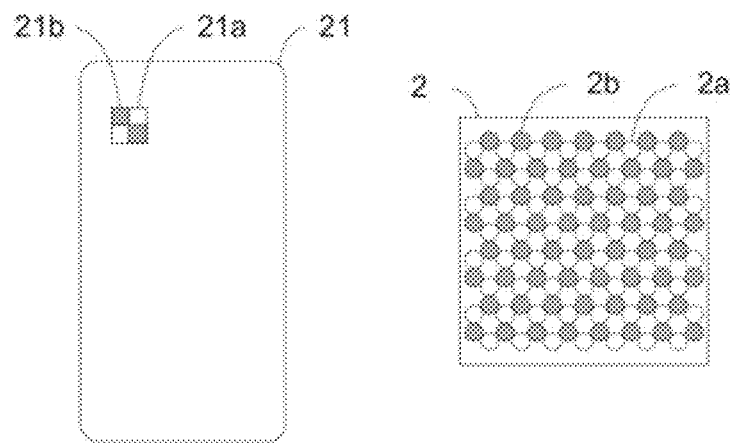
[Fig. 4]
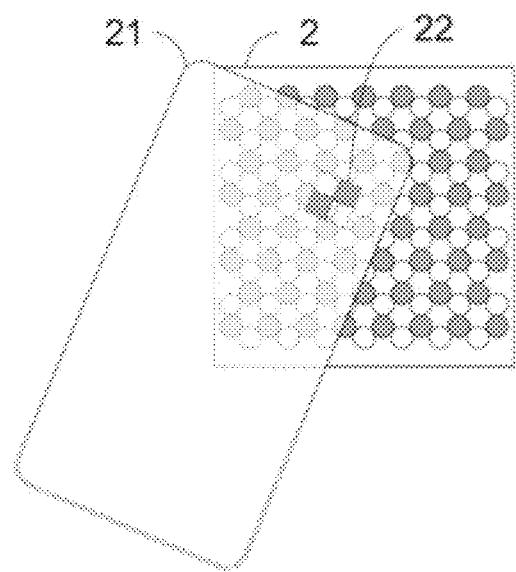

[Fig. 5]
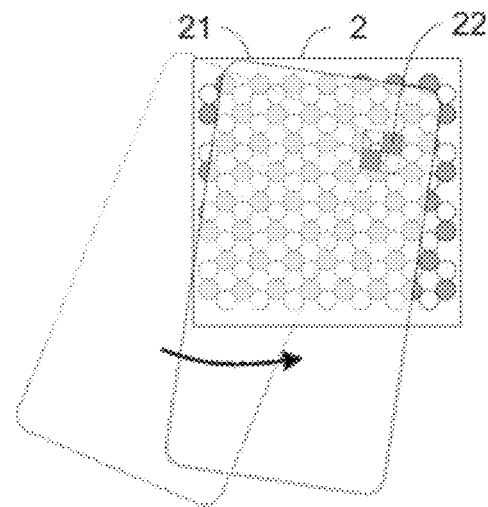
[Fig. 6]
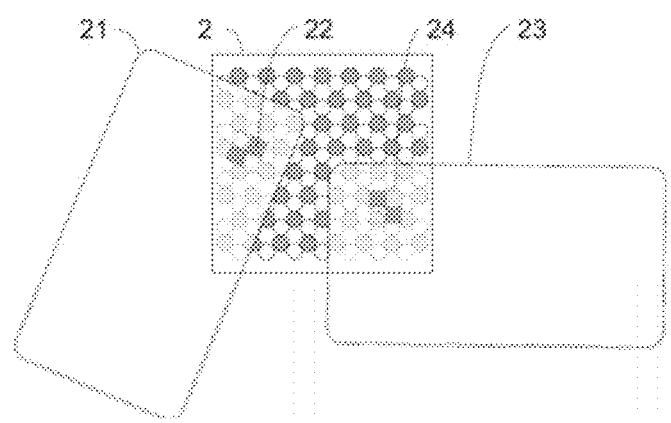

[Fig. 7]
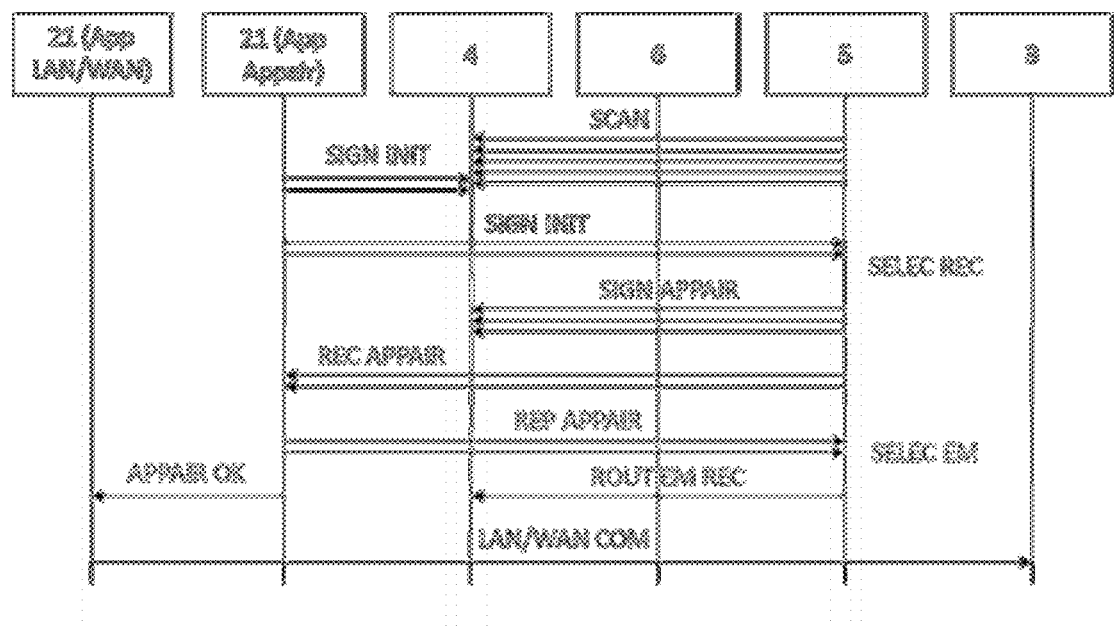
[Fig. 8]
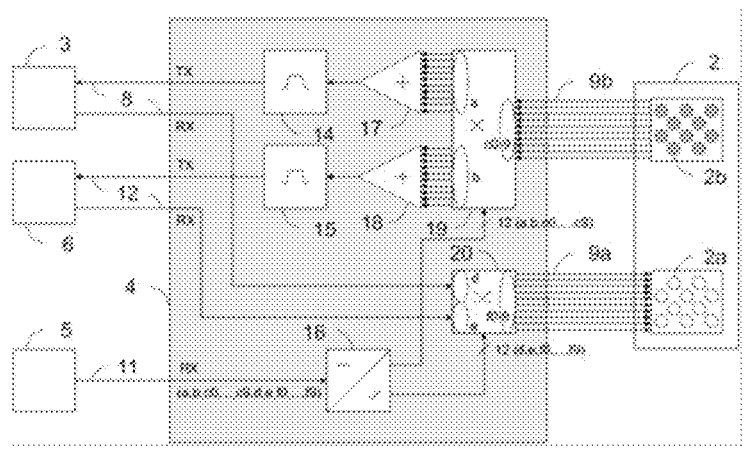

[Fig. 9]
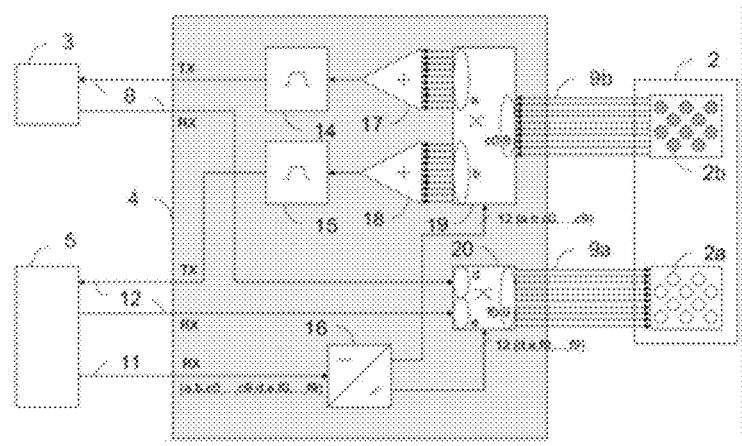
[Fig. 10]
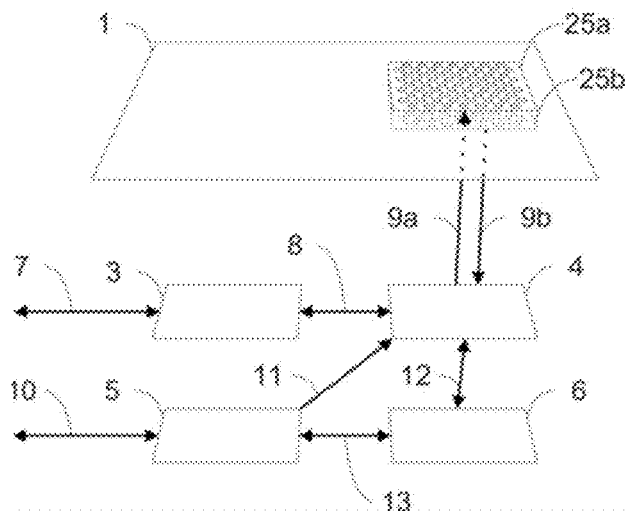

[Fig. 11]
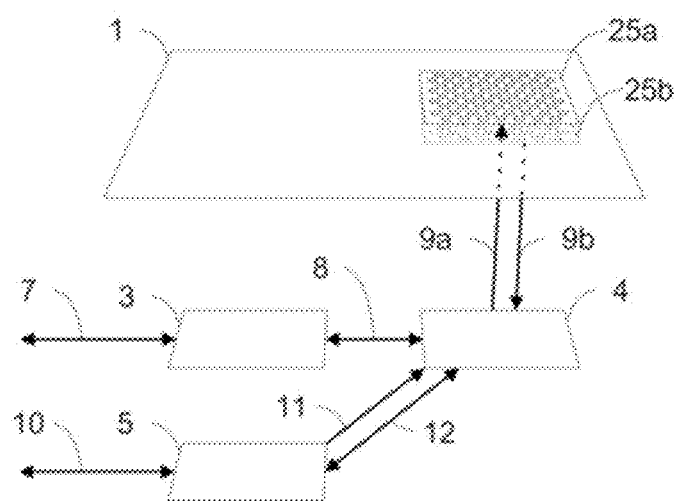

DEVICE AND MECHANISM FOR AUTOMATIC VLC-LAMP SELECTION

CROSS-REFERENCE TO RELATED APPLICATIONS

This Application is a Section 371 National Stage Application of International Application No. PCT/FR2020/051779, filed Oct. 8, 2020, which is incorporated by reference in its entirety and published as WO 2021/079040 A1 on Oct. 29, 2021, not in English.

TECHNICAL FIELD

The invention relates to the field of telecommunications.

More particularly, the invention relates to a communication device, a method for pairing such a device with a terminal, a system comprising such a device and a terminal, a terminal of such a system, a computer program for the execution of such a method, a docking station of such a device, and a central processing unit of such a device.

The objects of the invention are for example intended to be used within the sphere of:
- offices or service desks, in particular open offices, meeting rooms, and auditoriums,
- public workspaces such as libraries, waiting rooms, vehicles, and
- payment systems in banks and certain stores.

PRIOR ART

Currently, for the network side, visible light communication (VLC) transmitter/receiver devices based on LED (light-emitting diode) lamps in the visible light or infrared range for transmission, and for reception on photoreceptors sensitive to infrared, are integrated into lights in the form of ceiling lights, ceiling panels, floor lamps, or desk lamps.

These devices sometimes support multiple simultaneous communication sessions for terminals, mobile phones, tablets, and PCs, located in the same light stream, and the security of the communications resides, physically, in the isolation of the room, and for the communication, in the protocols of the network layer and upper layers.

However, there are cases where it is desirable to allow a user to use a VLC connection, while maintaining secrecy, in a room where other people are likely to come and go.

One obvious solution is to place the VLC devices, terminal and network, in a container opaque to visible and infrared light, but this is not suitable for terminals with an integrated VLC interface, where the screens and keyboards must remain accessible to users.

Another solution consists of using a work area with a network VLC device integrated into the work area and facing upwards, and using, on the terminal side, either a VLC device located on the rear face, or, for example for PCs, a VLC device which can be turned over to direct it downwards.

However, to satisfy the confidentiality requirements of the exchange at the physical level, this second solution requires solving the following dilemma:
- the transmission/reception device on the network side must be small in size, so that it does not exceed the size of the user terminal, or where applicable its external VLC device, and
- the transmission/reception device on the network side must also be positioned precisely opposite the user terminal, or where applicable its external VLC device, therefore possibly in a non-ergonomic manner, while allowing small movements.

SUMMARY

This disclosure improves the situation and aims in particular to resolve this dilemma by providing the possibility of maintaining the confidentiality of VLC communications between a network access point and conventional terminals, while allowing movement of the terminals.

To achieve this, according to one aspect, a communication device is proposed comprising:
- a docking station comprising a plurality of photoreceptors and a plurality of light sources interjacent with the photoreceptors, the plurality of photoreceptors and the plurality of light sources being suitable for visible light communication, and
- a central processing unit, connected to the docking station, configured for, when a portion of the plurality of photoreceptors of the docking station receives a light signal from at least one light source of a visible light communication interface of a terminal not paired with the docking station:
  - obtaining an initialization signal comprising an identification of said portion of the plurality of photoreceptors,
  - selecting, among the plurality of light sources of the docking station, a portion of the plurality of light sources in immediate proximity to said portion of the plurality of photoreceptors, on the basis of said identification,
  - ordering an emission of a pairing signal by said portion of the plurality of light sources,
  - obtaining a response signal, indicative of a signal emitted by said visible light communication interface of said terminal in response to the emission of the pairing signal and received by said portion of the plurality of photoreceptors of the docking station, and
  - ordering a pairing of said terminal with said portion of the plurality of photoreceptors of the docking station and with said portion of the plurality of light sources of the docking station, on the basis of the response signal.

"Paired terminal" is understood to mean a terminal associated, through a specific configuration of the communication device and/or of the terminal, so as to communicate exclusively with a specific zone of the docking station.

This specific zone of the docking station, which reciprocally is thus paired with the terminal, comprises a portion of the plurality of photoreceptors and a portion of the plurality of light sources of the docking station.

It is assumed that the visible light communication interface of the terminal comprises at least:
- a photoreceptor or group of photoreceptors (for example a photo or video sensor), and
- a light source or group of light sources (for example a flash).

It is also assumed that said light source is adjacent to said photoreceptor, meaning it is set apart from said photoreceptor by a distance of less than 5 cm for example.

"Unpaired terminal" is understood to mean a terminal that is not currently associated, by a specific configuration of the communication device and/or of the terminal, in a manner that communicates exclusively with a specific zone of the docking station.

By ordering the pairing of said terminal with said portion of the plurality of photoreceptors of the docking station and with said portion of the plurality of light sources of the docking station, the initially unpaired terminal becomes paired.

The term "a plurality of light sources interjacent with the photoreceptors" is to be understood as set forth below.

The photoreceptors of the plurality of photoreceptors are distributed, individually or in groups, in a first plane. For example, if the distribution is such that they are uniformly spaced apart, the plurality of photoreceptors forms an array of photoreceptors. The photoreceptors of the plurality of photoreceptors are oriented to receive light signals coming from a first direction normal to the first plane.

For example, by arbitrarily considering the first plane as horizontal, the photoreceptors are then oriented to receive light signals coming from a vertical direction, for example downwards from above.

The light sources of the plurality of light sources are distributed, individually or in groups. For example, if the distribution is such that they are uniformly spaced apart, the plurality of light sources form an array of light sources. The light sources of the plurality of light sources are oriented to emit light signals in a second direction opposite to said first direction.

Returning to the previous example where the first horizontal plane and the photoreceptors are oriented to receive light signals coming downwards from above, the light sources are then oriented to emit light signals in a vertical direction, upwards from below.

In one embodiment, the light sources of the plurality of light sources may be distributed, individually or in groups, in the first plane.

Alternatively, the light sources of the plurality of light sources may be distributed, individually or in groups, in a second plane substantially parallel to the first plane. The position of each light source or group of light sources in the second plane can then be likened to the orthogonal projection of their position onto the first plane.

The light sources are "interjacent with the photoreceptors" in that the docking station can be subdivided in the first plane into a plurality of zones each comprising both:
  a portion of the plurality of photoreceptors, and
  a portion of the plurality of light sources or the orthogonal projections onto the first plane of the positions of a portion of the plurality of light sources.

For example, the photoreceptors may form an array of individual photoreceptors or an array of groups of photoreceptors and the light sources may form an array of individual light sources or an array of groups of light sources, interwoven with the array of individual photoreceptors or groups of photoreceptors.

Thus, each zone of the docking station thus defined can be simultaneously paired with a separate terminal and form a separate channel for visible light communication.

The initialization signal obtained by the central processing unit is a signal allowing the central processing unit:
  to identify that a terminal capable of visible light communication is positioned relative to the docking station in a manner enabling the exchange of information via visible light communication with at least a portion of the light sources and photoreceptors present on the docking station, and, above all,
  to identify, among the plurality of light sources of the docking station, the portion of the plurality of light sources capable of transmitting information to the terminal thus positioned, and
  to identify, among the plurality of photoreceptors present on the docking station, the portion of the plurality of photoreceptors capable of receiving information transmitted by the terminal thus positioned.

The central processing unit thus detects the photoreceptor(s) receiving the initialization signal and can, for example, assess the positioning of the terminal relative to the docking station on the basis of the transmitted initialization signal.

In addition, the portion of the plurality of light sources capable of transmitting information to the terminal thus positioned can thus be selected, individually or in groups, and controlled to emit the pairing signal.

In addition, the portion of the plurality of photoreceptors capable of receiving information emitted by at least one light source of the terminal thus positioned can thus be selected, individually or in groups, and controlled to receive the response signal.

Selecting, among the plurality of light sources of the docking station, a portion of the plurality of light sources in immediate proximity to said portion of the plurality of photoreceptors is equivalent to addressing the light source(s) in immediate proximity to the photoreceptor(s) receiving the initialization signal.

The pairing signal emitted by the portion of the plurality of light sources thus selected makes it possible to establish communication with the terminal.

In particular, the pairing signal emitted by the docking station controlled by the central processing unit allows a terminal able to communicate by visible light communication and receiving this signal:
  to detect a communication device, more precisely to identify that the terminal is positioned in a manner enabling the exchange of information by visible light communication with this communication device, and,
  to receive instructions specifying the procedures for communication, such as the procedures for pairing, with this communication device.

The response signal received by the docking station and transmitted to the central processing unit allows the central processing unit:
  to obtain confirmation of receipt by the terminal of a pairing signal previously emitted by the docking station, and possibly:
  to obtain an identification, or a configuration indication, of the terminal,
  to obtain a configuration indication of the terminal, and/or
  to confirm or correct a previous assessment of the positioning of the terminal relative to the docking station, and/or
  to evaluate a transmission quality of the pairing signal, and/or
  to obtain instructions specifying the procedures for communication, such as the procedures for pairing, with the terminal.

The communication device may further comprise a modem connected to the central processing unit, the modem being configured for:
  receiving the command to emit a pairing signal by the central processing unit,
  ordering the emission of the pairing signal by said portion of the plurality of light sources of the docking station, and
  receiving the pairing command by the central processing unit.

It is thus possible to form a channel for visible light communication dedicated to the pairing of one or more terminals with a corresponding portion of the docking station, independently of the transmission of information to or from a wide area network.

The communication device may further comprise a network gateway connected to the central processing unit, the network gateway being configured for, when the network communication between said paired terminal and the network gateway is authorized by the central processing unit:
  forming a physical channel for visible light communication between said portion of the plurality of photoreceptors and said paired terminal, and
  establishing communication between the physical channel for visible light communication and a wide area network WAN.

It is thus possible to form a physical channel for visible light communication, communicating with a wide area network, independently of a channel dedicated to the pairing of one or more terminals with a corresponding portion of the docking station.

According to one embodiment, the pairing signal is emitted in a first wavelength band and the physical channel for visible light communication is active in a second wavelength band, the first and second wavelength bands being mutually exclusive.

The existence of two distinct channels for visible light communication between the two entities that are the docking station and the terminal, instead of a single common channel, presents the following advantages:
  a security advantage, by preventing the transmission of pairing-related information to a wide area network, especially if the modem and network gateway are two separate devices and if the wavelength bands used by the two channels are mutually exclusive, and
  an advantage in terms of fluidity of the communications, because the information relating to pairing traveling on the channel for visible light communication dedicated to pairing does not have a substantially undesirable effect on the transfer of data through the physical channel for visible light communication communicating with the wide area network, and vice versa.

It may be provided that the paired terminal and/or the central processing unit is/are also configured to periodically confirm the pairing.

In one embodiment, the terminal being paired with said portion of the plurality of light sources, the central processing unit is further configured for:
  periodically emitting a command to emit a confirmation signal, the confirmation signal being identical to the pairing signal and emitted by said portion of the plurality of light sources.

Thus, upon receiving the confirmation signal, the terminal receives confirmation that the channel for visible light communication is active. In response to receiving the confirmation signal, the terminal may send a confirmation response signal to confirm to the central processing unit that the channel for visible light communication has not changed.

It is thus possible to confirm, both at the paired terminal and at the central processing unit, whether the position of the paired terminal relative to the docking station is unchanged so that the paired terminal is still able to communicate through the physical channel for visible light communication.

It may also be provided that the terminal is be unpaired in the event of the central processing unit not receiving at least one confirmation response signal after a predetermined period of time has elapsed.

In one embodiment, the terminal being paired with said portion of the plurality of light sources, the central processing unit is further configured for:
  periodically emitting a command to emit a motion detection signal, the detection signal being identical to the pairing signal and emitted by an unpaired portion adjacent to said portion of the plurality of light sources of the docking station.

Thus, upon receiving the motion detection signal, the terminal receives confirmation that the channel for visible light communication is active. In response to receiving the motion detection signal, the terminal may emit a response signal, which can be interpreted by the central processing unit as an indication that the terminal has been moved on the surface of the docking station.

It may thus be provided that the central processing unit is configured for:
  obtaining a response signal to the motion detection signal received by an unpaired portion of the plurality of photoreceptors of the docking station that is adjacent to the portion of the plurality of photoreceptors paired with the terminal,
  identifying said unpaired portion of the plurality of photoreceptors,
  selecting an unpaired portion of the plurality of light sources of the docking station on the basis of said identification, and
  modifying the pairing of the terminal on the basis of said unpaired portion of the plurality of photoreceptors and of said unpaired portion of the plurality of light sources, so as to keep the channel for visible light communication active.

According to one embodiment, the terminal being paired with said portion of the plurality of light sources, the central processing unit is further configured for:
  ordering the emission of a modified pairing signal, different from the pairing signal and emitted by an unpaired portion of said portion of the plurality of light sources of the docking station.

The docking station can thus be subdivided into a plurality of portions each comprising a portion of the plurality of photoreceptors and a portion of the plurality of light sources.

In addition, each portion of the docking station can be controlled separately so as to emit a different pairing signal.

Each portion of the docking station can thus be simultaneously paired with a different terminal, forming a channel for visible light communication that can be established according to different procedures, such that the data exchanged between each paired terminal and the corresponding portion of the docking station cannot be intercepted by exchanging the position of two terminals relative to the docking station.

Another aspect of the invention is a method for pairing a terminal with a docking station comprising a plurality of photoreceptors and a plurality of light sources interjacent with the photoreceptors, the plurality of photoreceptors and the plurality of light sources being suitable for visible light communication, the method comprising, when a portion of the plurality of photoreceptors of the docking station receives a light signal from at least one light source of a visible light communication interface of the terminal and when the terminal is not paired with the docking station:
  obtaining an initialization signal comprising an identification of said portion of the plurality of photoreceptors,
  selecting, among the plurality of light sources of the docking station, a portion of the plurality of light sources in immediate proximity to said portion of the plurality of photoreceptors, on the basis of said identification, ordering an emission of a pairing signal by said portion of the plurality of light sources, obtaining a response signal, indicative of a signal emitted by said visible light communication interface of said terminal in response to the emission of the pairing signal and received by said portion of the plurality of photoreceptors of the docking station, and ordering a pairing of said terminal with said portion of the plurality of photoreceptors of the docking station and to said portion of the plurality of light sources of the docking station, on the basis of the response signal.

According to one embodiment, with the terminal further comprising a processing circuit connected to at least one photoreceptor and to said at least one light source, the method further comprises:

ordering, via the processing circuit, the emission of the light signal by said at least one light source of the terminal, obtaining, via the processing circuit, the pairing signal by said at least one photoreceptor of the terminal, and ordering, via the processing circuit, the emission of the response signal in response to the pairing signal.

Another aspect of the invention is a system comprising the aforementioned device and a terminal comprising a visible light communication interface.

According to one embodiment of such a system, the terminal being paired with said portion of the plurality of light sources, the central processing unit is further configured for:

periodically emitting a command to emit a motion detection signal, the detection signal being identical to the pairing signal and emitted by an unpaired portion adjacent to said portion of the plurality of light sources of the docking station.

Another aspect of the invention is a terminal of the aforementioned system, the terminal comprising:

a processing circuit comprising a processor connected to a memory, and a visible light communication interface, connected to the processing circuit, comprising at least one photoreceptor and at least one light source, the processing circuit being configured for:

ordering the emission of a light signal by said at least one light source, obtaining a pairing signal by said at least one photoreceptor, and ordering the emission of a response signal in response to the pairing signal.

The terminal is thus configured to transmit, to the communication device of the aforementioned system, the signals interpretable by the central processing unit of the communication device to enable pairing the terminal.

Another aspect of the invention is a computer program comprising instructions for implementing the aforementioned pairing method, when said instructions are executed by a processor.

Another aspect of the invention is a docking station of the aforementioned device, the docking station comprising:

a plurality of photoreceptors oriented to receive light signals coming from a first direction normal to a plane, a plurality of light sources, interjacent with the photoreceptors, oriented to emit light signals in a second direction opposite to said first direction, and a communication interface for communication with a central processing unit comprising a processor connected to a memory.

Thus, when the terminal is positioned facing the plurality of photoreceptors and the plurality of light sources, it is possible to initiate the aforementioned pairing method and then to establish a channel for visible light communication between the terminal and the docking station, this channel communicating with a wide area network.

Another aspect of the invention is a central processing unit of the aforementioned device, the central processing unit comprising a processor connected to a memory and to at least one communication interface for communication with a docking station, said docking station comprising a plurality of photoreceptors and a plurality of light sources interjacent with the photoreceptors, the plurality of photoreceptors and the plurality of light sources being suitable for visible light communication, the central processing unit being configured for, when a portion of the plurality of photoreceptors of the docking station receives a light signal from at least one light source of a visible light communication interface of a terminal not paired with the docking station:

obtaining an initialization signal comprising an identification of said portion of the plurality of photoreceptors, selecting, among the plurality of light sources of the docking station, a portion of the plurality of light sources in immediate proximity to said portion of the plurality of photoreceptors, on the basis of said identification, ordering an emission of a pairing signal by said portion of the plurality of light sources, obtaining a response signal, indicative of a signal emitted by said visible light communication interface of said terminal in response to the emission of the pairing signal and received by said portion of the plurality of photoreceptors of the docking station, and ordering a pairing of said terminal with said portion of the plurality of photoreceptors of the docking station and with said portion of the plurality of light sources of the docking station, on the basis of the response signal.

BRIEF DESCRIPTION OF DRAWINGS

Other features, details, and advantages will become apparent upon reading the detailed description below, and analyzing the appended drawings, in which:

FIG. 1 schematically represents the elements of a communication device according to one embodiment.

FIG. 2 schematically represents the elements of a communication device according to one embodiment.

FIG. 3 schematically represents a docking station and a terminal according to one embodiment.

FIG. 4 shows a terminal positioned facing a docking station so as to allow pairing according to one embodiment.

FIG. 5 shows a movement of a paired terminal relative to a docking station according to one embodiment.

FIG. 6 shows two terminals positioned facing a docking station so as to allow simultaneous pairing of the two terminals according to one embodiment.

FIG. 7 schematically represents a pairing method according to one embodiment.

FIG. 8 schematically represents an architecture of a router according to one embodiment.

FIG. 9 schematically represents an architecture of a router according to one embodiment.

FIG. 10 schematically represents the elements of a communication device according to one embodiment.

FIG. 11 schematically represents the elements of a communication device according to one embodiment.

DESCRIPTION OF EMBODIMENTS

For the most part, the drawings and the description below contain elements that are certain in nature. Therefore not only can they serve to provide a better understanding of this disclosure, they also contribute to its definition where appropriate.

Reference is now made to [FIG. 1], which schematically represents the elements of an exemplary communication device according to one embodiment of the invention.

Reference is also made to [FIG. 3], which schematically represents an exemplary docking station for such a communication device and an exemplary terminal capable of communicating with such a communication device.

The term "terminal" can denote, for example, a device such as a mobile device, for example a multifunction mobile phone (the term "smartphone" can be used) or a tablet. The term "terminal" can also denote, for example, a peripheral that can be connected to such a device or to a computer.

In the context of the invention, the terminal is equipped with a visible light communication interface which may be integrated into the terminal or may be in the form of a separate peripheral.

The communication device comprises a docking station 2 which may be integrated, fixed, or simply placed on a surface of a work area 1. Said surface of the work area 1 may for example correspond to an adjustable portion of the work area 1 so that it does not necessarily correspond to the same plane as the main surface of the work area 1.

In a non-limiting manner, the work area 1 may denote for example a table, a shelf, a desk, or a wall element, and may be located for example in an office, a meeting room, an auditorium, a work space, a library, a waiting room, a vehicle, etc.

The docking station 2 may be designed to comprise a surface intended to accommodate a terminal 21, or at least to accommodate the communication interface of the terminal 21.

The docking station 2 may be designed so that a terminal 21, or the communication interface of the terminal 21, arranged on a surface of the docking station 2 is retained there by gravity.

Thus, for example, the docking station 2 may be designed so that said surface of the docking station is horizontal when the docking station 2 is placed on a surface of a work area 1.

Alternatively, the docking station 2 may be designed so that said surface is inclined when the docking station 2 is placed on a surface of a work area 1. In such a case, the docking station 2 further comprises a restraint making it possible to maintain the terminal 21, or its communication interface, in a given position on said surface.

Such a restraint may comprise a sensor, for example a weight sensor, making it possible to detect the presence of one or more terminals 21 or communication interfaces of said terminals 21 on said surface, and possibly to identify a terminal, a terminal type, a terminal model, a type of terminal communication interface, or a model of terminal communication interface, by comparison with a weight indication associated in a database with said terminal, terminal type, terminal model, type of terminal communication interface, or model of terminal communication interface.

The communication device may further provide an attachment system for the terminal 21 or its communication interface. For example, such an attachment system may be provided as part of the docking station 2.

The docking station comprises a plurality of light sources 2a. The communication interface of the terminal 21 comprises at least one light source 21a.

It is understood that the light sources 2a, 21a are:
communicating, in that they can transmit signals,
controllable, in that said signals can be emitted in response to a command received, and
addressable, in that they have both their own address such as a MAC address and a dedicated physical port, individually or by group.

The light sources 2a, 21a may be positioned with line of sight or may be visible via an optical tunnel, and may consist for example of individual LEDs, or groups of LEDs constituting a screen.

The docking station comprises a plurality of photoreceptors 2b. The communication interface of the terminal 21 comprises at least one photoreceptor 21b.

It is understood that the photoreceptors 2b, 21b are also controllable and addressable, individually or by group.

The photoreceptors 2b, 21b may be positioned with line of sight or may be accessible via an optical tunnel, and may be individual photoreceptors or may form groups of photoreceptors, each group constituting a sensor, such as a photo or video optical sensor. Thus, for example, the terminal 21 can be equipped with an optical sensor as a "photoreceptor" 21b.

The light sources 2a, 21a may be designed to emit within at least one wavelength band which may for example be part of the visible spectrum and/or the infrared spectrum. The at least one light source 21a of the terminal 21 is configured to communicate by light waves with at least a portion of the plurality of photoreceptors 2b of the docking station 2. In addition, at least a portion of the plurality of light sources 2a of the docking station 2 is configured to communicate by light waves with the at least one photoreceptor 21b of the terminal 21.

It may further be arranged to order the activation of the plurality of photoreceptors 2b and/or of the plurality of light sources 2a of the docking station in response to a detection by the weight sensor of the presence of a terminal 21 or of its communication interface on said surface.

Thus, the plurality of photoreceptors 2b and/or the plurality of light sources 2a of the docking station 2 do not need to be permanently activated, which provides the economic and ecological advantages associated with minimizing energy consumption.

The light sources 2a are interjacent, individually or in groups, with the photoreceptors 2b such that the docking station can be subdivided into zones, each zone comprising a portion of the plurality of light sources 2a and a portion of the plurality of photoreceptors 2b. It is thus possible, for each zone of the docking station, to pair a terminal with such a zone.

In the exemplary embodiment shown in [FIG. 3], the light sources 2a and the photoreceptors 2b are distributed so as to form a matrix array comprising an array of light sources interleaved with an array of photoreceptors.

Other distributions, homogeneous or inhomogeneous, of light sources 2a and/or photoreceptors 2b are possible.

Alternatively, now referring to [FIG. 10], the photoreceptors 2b may be part of a photo or video sensor 25b. This sensor may be placed behind a semi-transparent LED screen 25a comprising the light sources 2a.

The communication device may comprise a router 4 for the light sources 2a and photoreceptors 2b, individually or in groups. The router 4 makes it possible to direct the modulations towards one light source 2a or another or towards a portion of the screen, and to accept the modulations originating from one photoreceptor 2b or another or from a portion of the photo or video sensor while directing them towards one modem or another.

The communication device comprises a central processing unit 5 comprising at least one memory and a processor connected to the memory and to at least one communication interface (for example the router 4) with the docking station 2. The central processing unit 5 may also be associated with, for example integrated into, the work area 1.

The memory of the central processing unit 5 stores a series of instructions enabling the central processing unit 5, when the instructions are executed by the processor, to select a portion of the plurality of light sources 2a and/or a portion of the plurality of photoreceptors 2b. An exemplary implementation of such a selection is software enabling the central processing unit 5 to control the router 4.

The memory of the central processing unit 5 also stores a series of instructions enabling the central processing unit 5, when the instructions are executed by the processor, to communicate via a physical channel for visible light communication with a partner pairing application hosted by the terminal 21.

The central processing unit may be connected to a network gateway 3 enabling the interfacing between the visible light communication network and at least one external LAN/WAN network, for example for Internet access for visible light communication terminals.

The central processing unit may be connected to a modem 6 for pairing between a portion of the plurality of light sources 2a and a portion of the plurality of photoreceptors 2b on the one hand, and the terminal 21 on the other hand.

Reference is now also made to [FIG. 8] which is a block diagram representing connections and an operation of a router of a communication device according to one exemplary embodiment.

In this example, the docking station 2 comprises an array of ten LEDs as light sources 2a and an array of ten discrete photodiodes as photoreceptors 2b.

The array of ten discrete photodiodes is interleaved with the array of ten LEDs.

The router 4 comprises:
- a cross connector 19 for the photodiodes, configured to receive a stream 9b of modulated electrical signals coming from the photodiodes 2b and indicative of light signals received by the photodiodes 2b,
- a signal adder 17 configured to receive, from the cross connector 19 for the photodiodes, a stream of modulated electrical signals, selected by the cross connector 19 from the stream 9b, and intended for a modem for visible light communication with the LAN/WAN 3,
- a module 14 for shaping the modulated electrical signals intended for the modem for visible light communication with the LAN/WAN 3,
- a signal adder 18 configured to receive from the cross connector 19 for the photodiodes a stream of modulated electrical signals, selected by the cross connector 19 from the stream 9b, and intended for a pairing modem 6,
- a module 15 for shaping the modulated electrical signals intended for the pairing modem 6.

The router 4 further comprises a cross connector/duplicator 20 for the LEDs, configured for:

- receiving, from the modem for visible light communication with the LAN/WAN 3, an analog stream 8 of a data exchange for LAN/WAN access,
- receiving, from the pairing modem 6, an analog stream 12 of a data exchange for pairing,
- receiving, from the central processing unit 5, a digital stream of commands 11, and
- emitting a stream of modulated currents 9a to the LEDs 2a on the basis of the analog stream 8 of the data exchange for LAN/WAN access, the analog stream 12 of the data exchange for pairing, and the digital stream of commands 11.

When a serial/parallel converter 16 receives a configuration command from the router 4 on its serial interface, it separates the command into two components, one intended for a cross connector/duplicator 20 for the LEDs and the other for a cross connector 19 for the photodiodes.

For the cross connector/duplicator 20 for the LEDs, provision may be made to rely on the values of two bits of the command, hereinafter "bit d" and "bit e", to select the type of signals to be transmitted by the LEDs 2a. Thus, it may be arranged that if bit d is 1, the LEDs 2a associated with outputs f0 to f9 whose bit value is 1 will be used for LAN/WAN access, and if bit e is 1, the LEDs 2a associated with outputs f0 to f9 whose bit value is 1 will be used for a pairing communication.

For the cross connector for photodiodes, provision may be made to rely on the values of two bits of the command, hereinafter "bit a" and "bit b", for the interpretation of signals received by the photodiodes 2b. Thus, it may be arranged that if bit a is 1, the photodiodes associated with inputs c0 to c9 whose bit value is 1 will be used for LAN/WAN access, and if bit b is 1, the photodiodes associated with inputs c0 to c9 whose bit value is 1 will be used for a pairing communication.

As for the central processing unit 5, here it carries out bursts of two messages where appropriate, the first concerning for example bits b and e with a selection of photodiodes and LEDs for the pairing communication, and the second concerning for example bits a and d with a selection of photodiodes and LEDs for the LAN/WAN access communication, while ensuring that there is no duplication in these selections.

The use and operation of the device described above may be described for example as follows, with reference to [FIG. 7].

The visible light communication interface occupies an arbitrarily large part of the work area and is initially in the following state:
- standby on the light source 2a side, and
- continual or periodic listening on all the photoreceptors 2b.

The user positions the visible light communication interface of his terminal on the arbitrarily large part of the work area which allows visible light communication, facing towards it, as represented for example in [FIG. 4].

The user launches on his terminal 21 the ad hoc pairing application App Appair, which orders the emission of an initialization light signal SIGN INIT by the at least one light source 21a, which makes it possible to initiate contact with the communication device.

For example, the initialization light signal SIGN INIT can carry a sequence of pairing requests associated with an identifier (for example a MAC address) specific to the terminal 21.

The central processing unit 5 of the communication device receives and decodes these successive requests and determines SELEC REC which photoreceptor(s) 2*b* or pixel(s) of the optical sensor receive(s) the initialization light signal SIGN INIT, if necessary selecting them successively one by one or group by group SCAN.

The central processing unit 5 then orders the return emission of pairing signals SIGN APPAIR by successively selecting the LEDs 2*a* or emission pixels one by one or group by group, and by inserting for example in these responses the individual or group address (for example a MAC address) of the LEDs and pixels concerned.

In the example above where the initialization light signal carries a sequence of pairing requests, the pairing signals emitted by the LEDs 2*a* each carry a response to a pairing request received. It may be arranged, for example, to insert in these responses the individual or group address (for example a MAC address) of the LEDs and pixels concerned.

The pairing application of the mobile terminal 21 receives REC APPAIR one or several pairing signals emitted by the LEDs 2*a* via its visible light communication interface, in particular via at least one photoreceptor 21*b*, and returns REP APPAIR to the application of the communication device, in a pairing message via this interface, the address or addresses received (for example MAC addresses).

The communication device 2 can then:
  decode this pairing message,
  determine on this basis SELEC EM the LEDs 2*a* whose pairing signals have been properly received and returned by the terminal 21, and thus
  order ROUT EM REC the routing of the visible light communication modulations and demodulations from and to the LAN/WAN network, solely for the LEDs, pixels, and photoreceptors concerned.

The other communication elements are then no longer used for the visible light communication connection.

The pairing application of the terminal 21 can then open APPAIR OK the channel for visible light communication with the network, and open a communication session LAN/WAN COM with the network, using for example a protocol such as IEEE 802.11bb or IEEE 802.15.7.

In some embodiments, in parallel, the terminal's pairing application resends pairing request messages at an arbitrary periodicity.

In some embodiments, in parallel, at another arbitrary periodicity, the application of the work area tests the neighboring visible light communication elements by repeating the pairing request detection sequence, which makes it possible to ensure a fast local handover because it is processed at the lowest level (short route), in the event of a movement as shown for example in [FIG. 5] of the terminal or of its visible light communication interface on the work area, by changing the LEDs, pixels, and photoreceptors providing the light communication on the work area side.

In some embodiments, in parallel, at another arbitrary periodicity, the application of the work area tests the neighboring visible light communication elements by repeating the pairing request detection sequence in order to deal locally with the possible presence, as represented for example in [FIG. 6], of another visible light communication terminal on the work area, which bears another identifier for its pairing application.

Thus, the active part of the work area performing the light emission can remain hidden by the terminal placed on this work area, continuing to do so even when it is moved, which provides the dual advantage of communication confidentiality at the physical level and not blinding users when they have to work in a dimly lit or night-time environment.

In some embodiments, the hardware devices and driver software of the photo/video sensor and of the semi-transparent LED screen can be integrated into a single device, such as a current nanocomputer of the Raspberry Pi or Arduino type.

In some embodiments, the application managing the visible light communication network interface may, if it receives signals from the terminal on several of its photoreceptors, restrict the use of its reception and demodulation resources for the communication session between the terminal and the network to a reduced number of these photoreceptors, chosen to be located as close as possible to the center of gravity of the photoreceptors concerned.

In some embodiments, additionally or alternatively to the previous one, the application managing the visible light communication network interface may, if it receives signals from the terminal on several of its photoreceptors, restrict the use of its reception and demodulation resources for the communication session between the terminal and the network to a reduced number of these photoreceptors, chosen to receive a higher candlepower than the others.

In some embodiments, the application managing the visible light communication network interface may, if it receives information from the terminal according to which it is receiving a signal emanating from several of its photoemitters, LEDs, or screen pixels, restrict the use of its emission and modulation resources for the communication session between the terminal and the network to a reduced number of these photoemitters, chosen to be located as close as possible to the center of gravity of the photoemitters concerned.

In some embodiments, the application managing the visible light communication network interface may host a mapping table associating, in a single map (topology), the photoemitter and photoreceptor elements that it manages, enabling it to restrict its emissions of the pairing sequence to only those LEDs or screen pixels topologically associated with the photoreceptors receiving a signal from the terminal.

In some embodiments, the pairing requests will be made by the work area, and the responses by the terminal, for example upon detection of contact on the work area (by the terminal, by the user).

In some embodiments, the user can directly adjust the value of the surface area of the visible light communication zone of the worktop, either by a control device placed thereon, or via a command accessible in the user interface of the terminal pairing application.

In some embodiments, the candlepower involved for the pairing procedure may advantageously be reduced compared to what is required to communicate with the LAN/WAN network, so as not to blind users.

In some embodiments, the light frequency involved for the pairing procedure may advantageously be different (red or infrared for example) from that required for communicating with the LAN/WAN network, so as not to blind or bother users.

In some embodiments, the pairing 3 and LAN/WAN 6 modems may be combined into a single device supporting these two functions.

In some embodiments, as illustrated in [FIG. 2], [FIG. 9], and [FIG. 11], the modem 3 supporting pairing and the central processing unit 5 may be combined into a single device supporting these two functions.

In some embodiments, the pairing procedure may be accelerated by proceeding in several steps, rather than by proceeding with a global scan of all the LEDs, photodiodes, or pixels: the addresses (MAC for example) will thus be variable and assigned to groups of these elements, becoming smaller and smaller at each stage of the process where only the "responding" elements are selected, down to the appropriate basic level, for example an LED and a discrete photodiode, or a small group of pixels.

This disclosure is not limited to the examples described above in support of the figures, presented only as examples to facilitate understanding the invention, but encompasses all variants conceivable to the skilled person within the context of the protection sought.

The invention claimed is:

1. A communication device comprising:
  a docking station comprising a plurality of photoreceptors and a plurality of light sources interjacent with the photoreceptors, the plurality of photoreceptors and the plurality of light sources being suitable for visible light communication, and
  a central processing unit, connected to the docking station, configured to perform the following acts in response to a portion of the plurality of photoreceptors of the docking station receiving a light signal from at least one light source of a visible light communication interface of a terminal not paired with the docking station:
    obtaining an initialization signal comprising an identification of said portion of the plurality of photoreceptors,
    selecting, among the plurality of light sources of the docking station, a portion of the plurality of light sources in immediate proximity to said portion of the plurality of photoreceptors, on the basis of said identification,
    ordering an emission of a pairing signal by said portion of the plurality of light sources,
    obtaining a response signal, indicative of a signal emitted by said visible light communication interface of said terminal in response to the emission of the pairing signal and received by said portion of the plurality of photoreceptors of the docking station, and
    ordering a pairing of said terminal with said portion of the plurality of photoreceptors of the docking station and with said portion of the plurality of light sources of the docking station, on the basis of the response signal.

2. The communication device according to claim 1, comprising a modem connected to the central processing unit, the modem being configured to:
  receive the command to emit a pairing signal by the central processing unit,
  order the emission of the pairing signal by said portion of the plurality of light sources of the docking station, and
  receive the pairing command by the central processing unit.

3. The communication device according to claim 1, comprising a network gateway connected to the central processing unit, the network gateway being configured to, in response to the network communication between said paired terminal and the network gateway being authorized by the central processing unit:
  form a physical channel for visible light communication between said portion of the plurality of photoreceptors and said paired terminal, and
  establish communication between the physical channel for visible light communication and a wide area network WAN.

4. The communication device according to claim 1, the terminal being paired with said portion of the plurality of light sources, the central processing unit being further configured to:
  periodically emit a command to emit a confirmation signal, the confirmation signal being identical to the pairing signal and emitted by said portion of the plurality of light sources.

5. The communication device according to claim 1, the terminal being paired with said portion of the plurality of light sources, the central processing unit being further configured to:
  periodically emit a command to emit a motion detection signal, the detection signal being identical to the pairing signal and emitted by an unpaired portion adjacent to said portion of the plurality of light sources of the docking station.

6. The communication device according to claim 1, the terminal being paired with said portion of the plurality of light sources, the central processing unit being further configured to:
  order the emission of a modified pairing signal, different from the pairing signal and emitted by an unpaired portion of said portion of the plurality of light sources of the docking station.

7. The communication device according to claim 1, wherein the pairing signal is emitted in a first wavelength band and the physical channel for visible light communication is active in a second wavelength band, the first and second wavelength bands being mutually exclusive.

8. A method for pairing a terminal with a docking station comprising a plurality of photoreceptors and a plurality of light sources interjacent with the photoreceptors, the plurality of photoreceptors and the plurality of light sources being suitable for visible light communication, the method being performed by the docking station and comprising, in response to a portion of the plurality of photoreceptors of the docking station receiving a light signal from at least one light source of a visible light communication interface of the terminal and the terminal being not paired with the docking station:
  obtaining an initialization signal comprising an identification of said portion of the plurality of photoreceptors,
  selecting, among the plurality of light sources of the docking station, a portion of the plurality of light sources in immediate proximity to said portion of the plurality of photoreceptors, on the basis of said identification,
  ordering an emission of a pairing signal by said portion of the plurality of light sources,
  obtaining a response signal, indicative of a signal emitted by said visible light communication interface of said terminal in response to the emission of the pairing signal and received by said portion of the plurality of photoreceptors of the docking station, and
  ordering a pairing of said terminal with said portion of the plurality of photoreceptors of the docking station and with said portion of the plurality of light sources of the docking station, on the basis of the response signal.

9. The method according to claim 8, the terminal further comprising a processing circuit connected to at least one photoreceptor and to said at least one light source, the method further comprising:
  ordering, via the processing circuit, the emission of the light signal by said at least one light source of the terminal, obtaining, via the processing circuit, the pairing signal by said at least one photoreceptor of the terminal, and ordering, via the processing circuit, the emission of the response signal in response to the pairing signal.

10. A system comprising the communication device according to claim 1 and the terminal comprising the visible light communication interface.

11. The system according to claim 10, the terminal being paired with said portion of the plurality of light sources, the central processing unit being further configured to:

periodically emit a command to emit a motion detection signal, the detection signal being identical to the pairing signal and emitted by an unpaired portion adjacent to said portion of the plurality of light sources of the docking station.

12. A non-transitory computer-readable medium comprising a computer program stored thereon comprising instructions for implementing a pairing method, when said instructions are executed by a processor of a communication device, wherein the method comprises:

pairing a terminal with a docking station comprising a plurality of photoreceptors and a plurality of light sources interjacent with the photoreceptors, the plurality of photoreceptors and the plurality of light sources being suitable for visible light communication, the pairing comprising, in response to a portion of the plurality of photoreceptors of the docking station receiving a light signal from at least one light source of a visible light communication interface of the terminal and the terminal being not paired with the docking station:

obtaining an initialization signal comprising an identification of said portion of the plurality of photoreceptors, selecting, among the plurality of light sources of the docking station, a portion of the plurality of light sources in immediate proximity to said portion of the plurality of photoreceptors, on the basis of said identification, ordering an emission of a pairing signal by said portion of the plurality of light sources, obtaining a response signal, indicative of a signal emitted by said visible light communication interface of said terminal in response to the emission of the pairing signal and received by said portion of the plurality of photoreceptors of the docking station, and ordering a pairing of said terminal with said portion of the plurality of photoreceptors of the docking station and with said portion of the plurality of light sources of the docking station, on the basis of the response signal.

* * * * *